US012726227B2

(12) United States Patent
Shen

(10) Patent No.: US 12,726,227 B2
(45) Date of Patent: Sep. 1, 2026

(54) TRANSMISSION PATH CONTROL METHOD AND APPARATUS, AND TERMINAL AND STORAGE MEDIUM

(71) Applicant: ZTE CORPORATION, Shenzhen (CN)

(72) Inventor: Shaowu Shen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 289 days.

(21) Appl. No.: 18/293,907

(22) PCT Filed: Jun. 23, 2022

(86) PCT No.: PCT/CN2022/100839
§ 371 (c)(1),
(2) Date: Jan. 31, 2024

(87) PCT Pub. No.: WO2023/016100
PCT Pub. Date: Feb. 16, 2023

(65) Prior Publication Data
US 2025/0007553 A1 Jan. 2, 2025

(30) Foreign Application Priority Data
Aug. 9, 2021 (CN) ......................... 202110910008.1

(51) Int. Cl.
*H04B 1/401* (2015.01)
*H04W 40/12* (2009.01)

(52) U.S. Cl.
CPC ............ *H04B 1/401* (2013.01); *H04W 40/12* (2013.01)

(58) Field of Classification Search
CPC .. H04B 7/0413; H04B 7/0617; H04B 1/0057; H04B 1/40; H04B 1/18; H04B 7/0608;
(Continued)

(56) References Cited

U.S. PATENT DOCUMENTS 10,866,595 B2 * 12/2020 Wänstedt .............. H04W 24/02
2013/0225107 A1 * 8/2013 Lane .................... H04B 1/0458 455/234.1

(Continued)

FOREIGN PATENT DOCUMENTS

CN 103023545 A 4/2013
CN 109151969 A 1/2019

(Continued)

OTHER PUBLICATIONS

European Patent Office. Extended European Search Report for EP Application No. 22855085.1, mailed Oct. 15, 2024, pp. 1-11.

(Continued)

*Primary Examiner* — Golam Sorowar
(74) *Attorney, Agent, or Firm* — Vivacqua Crane, PLLC

(57) ABSTRACT

Disclosed are a transmission path control method and apparatus, a terminal device and a storage medium. The transmission path control method may include: detecting a service requirement and/or a network feature of a current terminal device (101); matching a corresponding transmission path adjustment mode (102); and adjusting a transmission path from a radio frequency chip to an antenna (103), where the number of components through which a transmission path after the adjustment passes is less than the number of components through which the transmission path before the adjustment passes, or an RF conduction path and wiring after the adjustment are shorter than an RF conduction path and wiring before the adjustment, or an antenna coverage frequency band corresponding to an antenna path after the adjustment is less than an antenna coverage frequency band corresponding to an antenna path before the adjustment.

13 Claims, 9 Drawing Sheets

(58) Field of Classification Search

CPC .... H04B 1/006; H04B 17/336; H04B 7/0404; H04B 7/0691; H04B 17/14; H04B 17/12; H04B 17/104; H04B 1/401; H04B 17/318; H04B 7/0695; H04B 1/005; H04B 17/364; H04B 7/0626; H04B 7/06952; H04B 7/088; H04B 1/0064; H04B 1/1027; H04B 1/1036; H04B 1/3838; H04B 1/44; H04B 17/102; H04B 17/19; H04B 17/328; H04B 17/345; H04W 72/0453; H04W 52/367; H04W 52/146; H04W 24/08; H04W 24/10; H04W 52/42; H04W 88/06; H04W 16/14; H04W 24/02; H04W 56/004; H04W 76/15; H04W 88/10; H04W 52/243; H04W 72/23; H04W 8/22; H04W 52/241; H04W 56/0055; H04W 64/00; H04W 40/12; H04W 40/248; H04W 48/16; H04W 52/325; H04W 72/541; H04W 88/02; H04W 16/26; H04W 16/28; H04W 40/244; H04W 52/028; H04W 52/242; H04W 72/1263

See application file for complete search history.

(56) References Cited

U.S. PATENT DOCUMENTS

2013/0324056 A1 12/2013 Maguire
2015/0366099 A1 12/2015 Lee
2017/0359755 A1* 12/2017 Kurz .................... H04W 40/12
2018/0131478 A1 5/2018 Song et al.
2019/0305831 A1* 10/2019 Freisleben ........... H04B 7/0413
2020/0187128 A1 6/2020 Yao et al.
2020/0343964 A1* 10/2020 Ashworth .......... H04B 7/15571
2021/0036792 A1 2/2021 Torrico
2022/0105971 A1 4/2022 Winter
2022/0386216 A1* 12/2022 Shen .................... H04W 40/12

FOREIGN PATENT DOCUMENTS

CN 112153716 A * 12/2020 ........... H04W 40/12
CN 112703782 A 4/2021
EP 3965474 A1 3/2022
JP 2015508268 A 3/2015
JP 2016521468 A 7/2016
JP 2022549035 A 11/2022
WO 2021004643 A1 1/2021
WO 2021057215 A1 4/2021

OTHER PUBLICATIONS

International Searching Authority. International Search Report and Written Opinion for PCT Application No. PCT/CN2022/100839 and English translation, mailed Jul. 27, 2022, pp. 1-10.

Industrial Property Cooperation Center (IPCC). Search Report for JP Application No. 2024-506276 and English translation, mailed Dec. 24, 2024, pp. 1-26.

Japan Patent Office. Notice of Reasons for Refusal for JP Application No. 2024-506276 and English translation, mailed Jan. 7, 2025, pp. 1-8.

* cited by examiner

TRANSMISSION PATH CONTROL METHOD AND APPARATUS, AND TERMINAL AND STORAGE MEDIUM

CROSS-REFERENCE TO RELATED APPLICATION

This application is a national stage filing under 35 U.S.C. § 371 of international application number PCT/CN2022/100839, filed Jun. 23, 2022, which claims priority to Chinese patent application No. 202110910008.1 filed on Aug. 9, 2021. The contents of these applications are incorporated herein by reference in their entirety.

TECHNICAL FIELD

The present disclosure relates to the field of communications, and in particular to a transmission path control method and apparatus, a terminal device, and a storage medium.

BACKGROUND

With the development and evolution of communication technology, how to improve the transmit power and reception sensitivity to enhance the radio frequency (RF) and antenna performance of terminal devices and reduce resource losses in communication systems has become an urgent problem to be solved.

The increasing variety of terminal standards and frequency bands has led to a significant proliferation of transmission paths between the RF chip and the antenna of the terminal device. However, due to the limited space in mobile phones and the restrictions on the number of antennas, i.e., the fact that many frequency bands may share one single antenna, the configuration of transmission paths involves RF switching or combining components within the terminal device, and each component has an impact on the transmission performance of the transmission path, thus affecting the overall communication system. Some terminal devices use a fixed, single RF transmission path to control the transmission path. Because the transmission path is fixed, the resource loss in the transmission path remains constant, and even if there is a potentially lower loss path available during the transmission process, the terminal device cannot switch to the lower loss path.

Therefore, there is a need for a solution to enable terminal devices to achieve adaptive selection of transmission paths and reduce resource losses in communication systems.

SUMMARY

Several embodiments of the present disclosure provide a transmission path control method and apparatus, a terminal device, and a storage medium.

An embodiment of the present disclosure provides a transmission path control method, which may include: detecting a service requirement and/or a network feature of a current terminal device; matching a corresponding transmission path adjustment mode according to the currently detected service requirement and/or network feature; and adjusting a transmission path from a radio frequency chip to an antenna according to the matched transmission path adjustment mode, where the number of components through which a transmission path after the adjustment passes is less than the number of components through which the transmission path before the adjustment passes, or an RF conduction path and wiring after the adjustment are shorter than an RF conduction path and wiring before the adjustment, or an antenna coverage frequency band corresponding to an antenna path after the adjustment is less than an antenna coverage frequency band corresponding to an antenna path before the adjustment. The transmission path includes the radio frequency conduction path and the antenna path, and the antenna path is used for antenna selection.

An embodiment of the present disclosure provides a transmission path control apparatus, which may include: a detection module configured to detect a service requirement and/or a network feature of a current terminal device; a matching module configured to match a corresponding transmission path adjustment mode according to the currently detected service requirement and/or network feature; and an adjustment module configured to adjust a transmission path from a radio frequency chip to an antenna according to the matched transmission path adjustment mode, where the number of components through which a transmission path after the adjustment passes is less than the number of components through which the transmission path before the adjustment passes, or an RF conduction path and wiring after the adjustment are shorter than an RF conduction path and wiring before the adjustment, or an antenna coverage frequency band corresponding to an antenna path after the adjustment is less than an antenna coverage frequency band corresponding to an antenna path before the adjustment. The transmission path includes the radio frequency conduction path and the antenna path, and the antenna path is used for antenna selection.

An embodiment of the present disclosure provides a terminal device, which may include: at least one processor; and a memory communicatively connected to the at least one processor. The memory stores instructions executable by the at least one processor, the instructions is executed by the at least one processor to enable the at least one processor to perform the transmission path control method described above.

An embodiment of the present disclosure provides a computer-readable storage medium storing a computer program which, when executed by a processor, implements the transmission path control method described above.

BRIEF DESCRIPTION OF DRAWINGS

One or more embodiments are exemplarily illustrated with reference to corresponding figures in the accompanying drawings, and these exemplary illustrations do not constitute a limitation to the embodiments. Elements having same reference signs in the accompanying drawings represent similar elements. The figures in the accompanying drawings are not necessarily drawn to scale unless otherwise specified.

DETAILED DESCRIPTION

In order to make the purposes, technical schemes and advantages of the embodiments of the present disclosure clear, the embodiments of the present disclosure will be described in detail with reference to the accompanying drawings. Those having ordinary skill in the art can understand that, in various embodiments of the present disclosure, many technical details have been set forth in order to enable readers to better understand the present disclosure. However, even without these technical details and various changes and modifications based on the following embodiments, the technical schemes of the present disclosure can be implemented. The following embodiments are divided for convenience of description, and should not constitute any limitation on the specific implementation of the present disclosure. The embodiments can be combined with and referenced by each other with no conflict.

Figure 1:
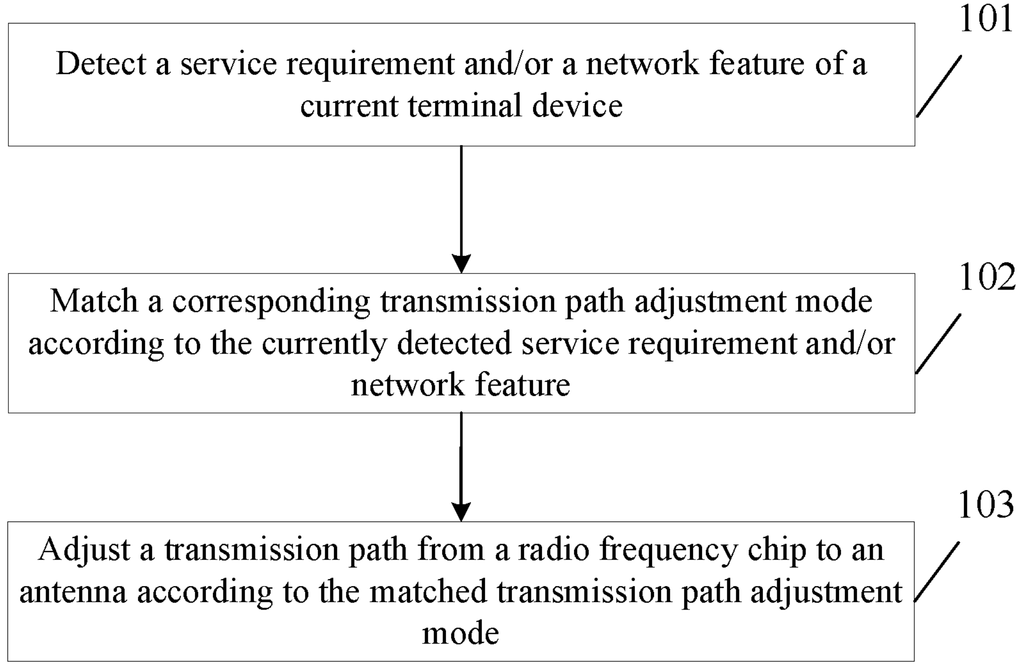
FIG. 1 is a flowchart of a transmission path control method according to an embodiment of the present disclosure.

An embodiment of the present disclosure relates to a transmission path control method, as shown in FIG. 1, including the following steps.

At step 101, a service requirement and/or a network feature of a current terminal device is detected.

At step 102, a corresponding transmission path adjustment mode is matched according to the currently detected service requirement and/or network feature.

At step 103, a transmission path from a radio frequency chip to an antenna is adjusted according to the matched transmission path adjustment mode, where the number of components through which a transmission path after the adjustment passes is less than the number of components through which the transmission path before the adjustment passes, or an RF conduction path and wiring after the adjustment are shorter than an RF conduction path and wiring before the adjustment, or an antenna coverage frequency band corresponding to an antenna path after the adjustment is less than an antenna coverage frequency band corresponding to an antenna path before the adjustment. The transmission path includes the radio frequency conduction path and the antenna path, and the antenna path is used for antenna selection.

The transmission path control method of the embodiment is applied to wireless communication terminal devices, such as mobile phones, tablets, and notebook computers. Due to the increasingly complex functions of terminal devices, for example, one single mobile phone needs to be compatible with most functions of cellular mobile communications, Wi-Fi, Bluetooth and Global Positioning System (GPS) at the same time, and needs to meet the frequency band requirements of 2G/3G/4G/5G, covering frequency bands ranging from 600 MHz to 6 GHz. To achieve higher data transmission rates, it is also necessary to implement Multiple Input Multiple Output (MIMO) and Carrier Aggregation (CA) technologies. There will be more than 30 frequency bands and more than 10 antennas in a mobile phone. Each frequency band, such as B1 frequency band, is further divided into four MIMO channels: main set, diversity set, main MIMO, and diversity MIMO. Each channel will be divided into more than 4-20 branch paths due to different physical components, so there may be more than 20 RF transmission paths for each frequency band.

Figure 2:
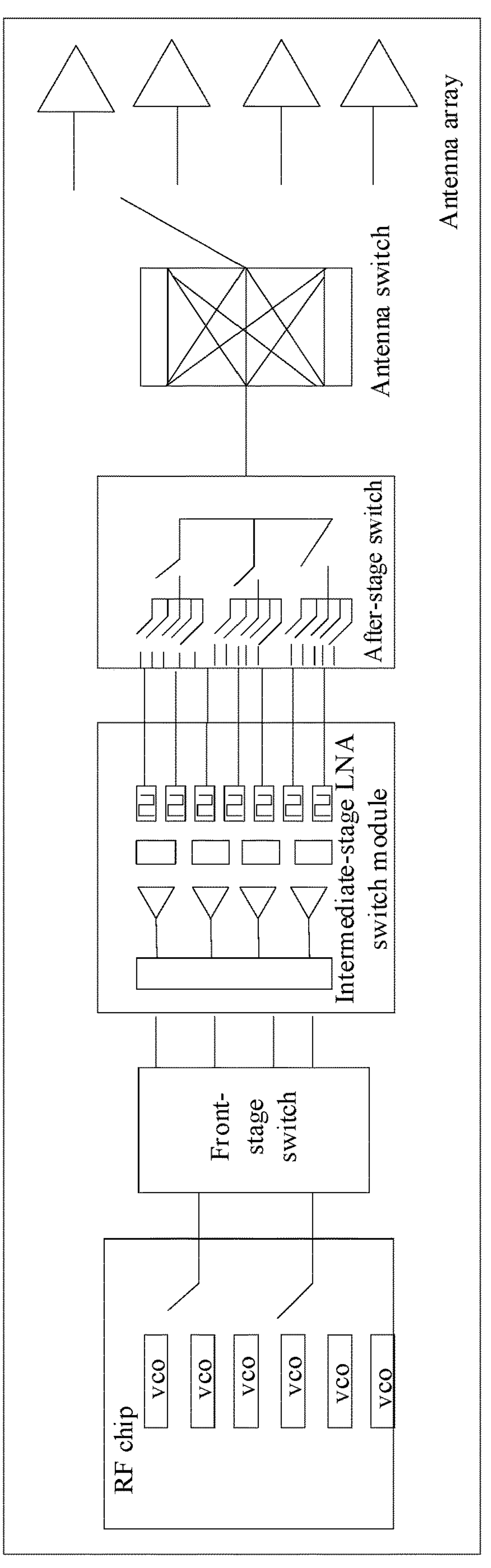
FIG. 2 is a schematic diagram of transmission paths of an RF front-end module according to an embodiment of the present disclosure.

In addition to the antenna path, the transmission path of the terminal device also includes the transmission path of the RF front-end module as shown in FIG. 2. The transmission path controlled by the terminal device in the present disclosure refers to the transmission path in the RF front-end module, from the RF chip to the antenna or the test point (test socket), and also including the front-stage switch, intermediate-stage Low Noise Amplifier (LNA for short), after-stage switch, antenna switch and so on in between. Because there are many switches and filters in the transmission path, and in order to be compatible with the coexistence requirements such as carrier aggregation, some RF switching or combiner components are needed, such as 3P3T switch, DP4T switch, SPDT switch, N-pole N-throw switch (NPNT), Duplexer (DIPLEXER), frequency divider (TRIPLEXER), and some extractors, power dividers, combiners, etc., which will lead to large losses, and therefore many transmission paths are often not optimal in RF performance and data performance.

In some terminal devices, the transmission path is fixed and single. When there are abnormalities or other requirements of the path, the terminal device cannot switch the path through a bypass mode. To enable bypass mode for the transmission path, it would require modifying the compatible circuitry of the terminal device and changing the surface mount component list. Therefore, even in scenarios where the transmission path may result in higher resource losses, it is not possible to alter the transmission path. At the same time, the setup process of the entire transmission path is complex due to the large number of RF channels and transmission paths that need to be routed and laid out on a limited Printed Circuit Board (PCB) area, requiring considerations for compatibility, isolation, data throughput, and user experience, which leads to many factors to be considered.

In this embodiment, a corresponding transmission path adjustment mode is matched according to the currently detected service requirement and/or network feature, and a transmission path from a radio frequency chip to an antenna is adjusted according to the matched transmission path adjustment mode. As the transmission path passes through each component, the system invariably incurs resource losses. However, the number of components through which a transmission path after the adjustment passes is less than the number of components through which the transmission path before the adjustment passes, or an RF conduction path and wiring after the adjustment are shorter than an RF conduction path and wiring before the adjustment, or an antenna coverage frequency band corresponding to an antenna path after the adjustment is less than an antenna coverage frequency band corresponding to an antenna path before the adjustment. The transmission path includes the radio frequency conduction path and the antenna path, and the antenna path is used for antenna selection. Therefore, the performance of the transmission path after the adjustment surpasses that of the original transmission path. Hence, the adjusted transmission path results in reduced resource losses compared to the original transmission path, effectively minimizing resource losses in the communication system.

The following is a detailed explanation of the implementation details regarding the transmission path control method in this embodiment. Please note that the provided implementation details are for illustrative purposes only and not mandatory for implementing the proposed scheme.

In step 101, the terminal device detects a service requirement and/or a network feature of a current terminal device.

For the detection of network features, the terminal device uses the antenna to receive a communication signal from a base station, after filtering, signal amplification and other processing, the signal enters the RF main chip for frequency conversion, and then is transmitted to a baseband processing chip. The baseband chip carries out analog-to-digital processing on the signal and converts it into corresponding network parameters, for example, network type (such as GSM, WCDMA, CDMA, LTE, and NR), cell information (such as Cell info, and PCI), frequency band (such as B1/B3/N78/N41, etc.), channel number (ARFCN) or central frequency point, and signal quality parameters, such as signal strength (such as RSSI and RSRP), signal-to-noise ratio (SNR), channel quality indication (CQI), uplink transmit power, and also including scheduling parameters such as the number of DLRI data streams, uplink MCS, downlink MCS, and SRS polling mechanism. By collecting and comparing these network parameters, the terminal device can acquire the difference of network signal quality under different transmission paths, so as to perform the transmission path control accordingly. The terminal device will configure the keywords corresponding to the network parameters into a corresponding LOG mask set, and through systematically collecting, filtering and summarizing, the key parameters are acquired and then reported.

In an example, the network feature includes network environment and/or path loss of a transmission path, where the network environment includes one of the following network parameter indicators or any combination thereof: operating frequency band, operating frequency point, wireless signal strength, uplink and downlink call quality, data throughput, or bit error rate.

In this embodiment, the terminal device controls the transmission path according to various network parameter indicators and any combination thereof, so that the adjusted transmission path fits the network situation of the terminal device and meets the actual use needs of the terminal device.

For the detection of service requirements, the terminal device uses the baseband chip to collect the working mode of RF chip, and extracts key parameters and information, such as air LOG information and service reporting information, by detecting the wireless parameter LOG of the current terminal device in communication.

In an example, the service requirement includes any one of a diversity mode, a multiple input multiple output (MIMO) mode, a carrier aggregation (CA) mode, a non-CA mode, a lower antenna mode, a non-lower antenna mode, a standalone (SA) network mode, a non-standalone (NSA) network mode, a harmonic intermodulation interference mode, a no harmonic intermodulation interference mode, a head-hand mode, a free space mode, a coexistence mode, or a non-coexistence mode, or any combination thereof. Herein, the above requirement information includes air LOG information and service reporting information, for example, the RX MIMO mode includes RX1, RX2, RX3, RX4 and other modes, the CA and non-CA modes includes uplink CA, downlink CA, 2CA, 3CA, 4CA, 5CA, etc., the lower antenna and non-lower antenna modes include the ASDIV switching mode and non-switching mode of upper and lower antennas, harmonic intermodulation interference and non-harmonic intermodulation interference modes, the head-hand and free space modes include free space, left and right head-hand communication modes, and the coexistence and non-coexistence modes include coexistence modes of LTE, NR, WI-FI, etc.

In this embodiment, by controlling the transmission path according to various service requirements and any combination thereof, the adjusted transmission path can meet the service requirements of the terminal device and meet the actual use requirements of the terminal device.

In step 102, the terminal device matches a corresponding transmission path adjustment mode according to the currently detected service requirement and/or network feature. When the transmission path control method of the embodiment is enabled, the terminal device collects the LOG parameter set in real time, and analyzes the parameters of different transmission paths at different times for comparison. According to the detection and comparison results, the terminal device calculates according to the current network quality, service requirements, the insertion loss of system of each path, the interference detection situation, and the use situation of upper and lower antennas, and matches and selects the most appropriate adjustment mode and parameters.

Figure 3:
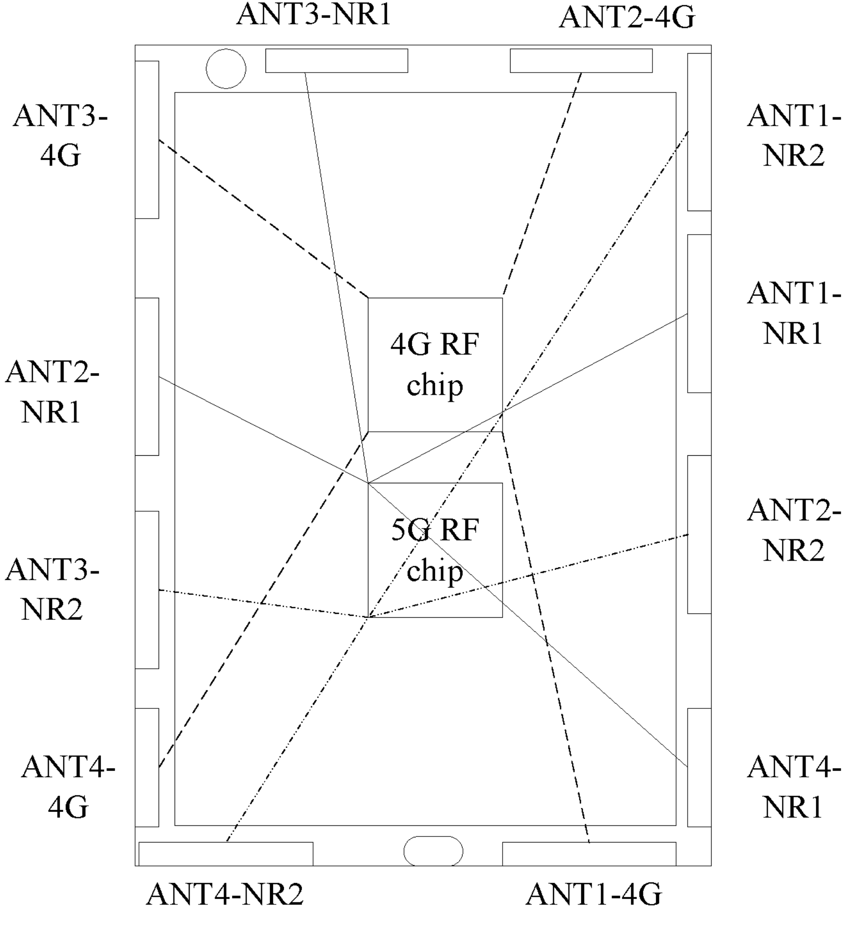
FIG. 3 is a schematic diagram of transmission paths for RX MIMO reception service according to an embodiment of the present disclosure.

For example, taking RX MIMO reception service as an example, as shown in FIG. 3, there are many transmission paths for 4G and 5G, the path losses of different transmission paths are different, and the performance of different transmission paths is quite different, which will lead to poor channel balance. If the performance of four channels of a 4*4 MIMO is unbalanced, the received RSRP signal level will be inconsistent, which will directly affect the MIMO throughput performance under dual-stream or four-stream in severe cases, that is, low modulation performance will lead to high bit error rate, which in turn will lead to low throughput rate. Therefore, when it is detected that the current terminal device is in 4*4 MIMO service and the RSRP of the four channels is inconsistent, the terminal device can carry out the corresponding transmission path adjustment mode, so as to reduce the path loss of the path with large loss or increase the path loss of the path with small loss, so as to achieve the purpose of balancing the loss of all the paths, making the receiving level consistent, and improving the data throughput performance of the terminal device.

In an example, the terminal device queries a preset mapping relationship to find the transmission path adjustment mode corresponding to the currently detected service requirement and/or network feature so as to obtain the matched transmission path adjustment module, where the mapping relationship is used for storing a correspondence between service requirements and/or network features and transmission path adjustment modes.

Figure 4:
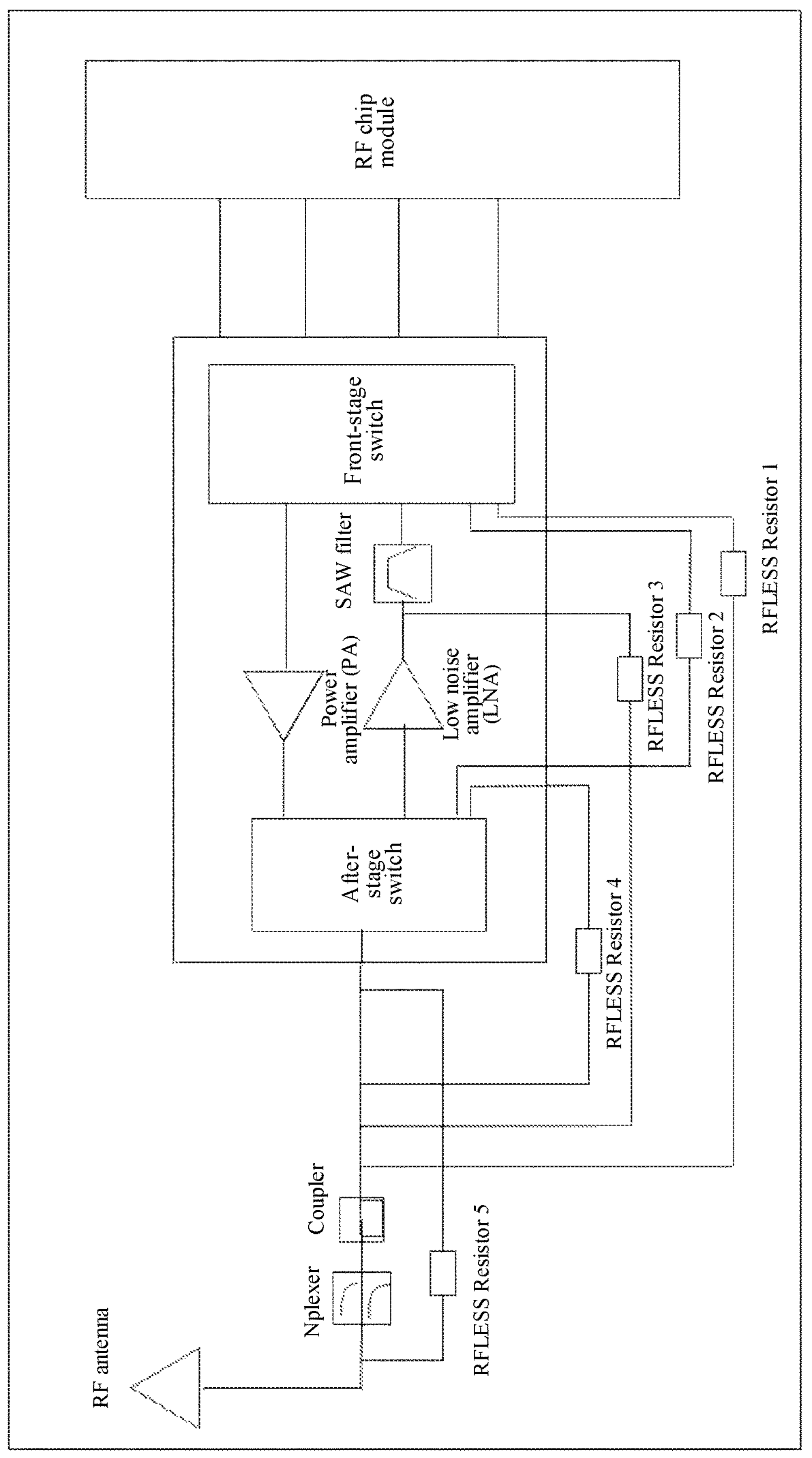
FIG. 4 is a schematic diagram of transmission paths passing through signpost components according to an embodiment of the present disclosure.

The terminal device can calculate the system loss of the required transmission path in advance and obtain the corresponding set transmission path adjustment mode. Herein, the terminal device can preset the transmission path adjustment modes through two calculation approaches. The first approach involves modeling the individual loss of each RF path, component and trace including perforation, and by tracking which signpost components the path passes through, the losses of each unit can be accumulated to form the system loss. As shown in FIG. 4, B3 frequency band is emitted from the transceiver chip and passes through LNA, a primary switch, Surface Acoustic Wave (SAW), SP2T switch, Diplexer, DPDT and 3P3T switch in turn to the target test socket. Losses of these component units plus losses of intermediate traces and perforations are the overall system loss. Since the losses of each unit element in the system loss are known, assuming the frequency points are confirmed and the board material and trace widths are determined, it is possible to calculate the overall loss of the transmission path by detecting the components the path passes through. The second method involves the terminal device performing automatic gain control (AGC) level scanning and self-scanning of reference signal receiving power (RSRP), or conducting research and development signal testing scans, to measure the system losses of all transmission paths. For example, from chip port A to test point B, if the signal passes through path 1, the system loss insertion loss is Slab, if the signal passes through path 2, the system loss insertion loss is S2ab, and similarly, for path 3 and path 4, the system loss insertion losses are S3ab and S4ab, respectively. These four insertion loss values are stored in the terminal device for future reference.

In this embodiment, by querying a preset mapping relationship to find the transmission path adjustment mode corresponding to the currently detected service requirement and/or network feature, the matched transmission path adjustment mode is obtained. Since the mapping relationship is used for storing a correspondence between service requirements and/or network features and transmission path adjustment modes, that is, the service requirements and/or network features and the transmission path adjustment modes are mapped and stored in advance, when the terminal device actually performs the transmission path control, a corresponding matched transmission path adjustment mode can be acquired by querying according to the current service requirement and/or network feature, thus enabling the terminal device to achieve adaptive selection of transmission paths and reduce resource losses in the communication system.

In step 103, the terminal device adjusts a transmission path from a radio frequency chip to an antenna according to the matched transmission path adjustment mode, where the number of components through which a transmission path after the adjustment passes is less than the number of components through which the transmission path before the adjustment passes, or an RF conduction path and wiring after the adjustment are shorter than an RF conduction path and wiring before the adjustment, or an antenna coverage frequency band corresponding to an antenna path after the adjustment is less than an antenna coverage frequency band corresponding to an antenna path before the adjustment, the transmission path includes the radio frequency conduction path and the antenna path, and the antenna path is used for antenna selection, that is, the performance of the transmission path after the adjustment surpasses that of the original transmission path.

The terminal device can adjust the transmission path by adjusting any one of a passive component, an active component, a circuit, or an antenna and any combination thereof.

Herein, the adjustment of passive components may be adjustment of any one or more of the SAW and LTCC filters, switches (SPDT, DPDT, SP3T, SPNT, 3P3T, 4T4T, NPNT, etc.), nplexer frequency dividers (Diplexer, Triplexer, mulplexer), extractors, trap filters, diplexers, triplexers, couplers, etc.

Figure 5:
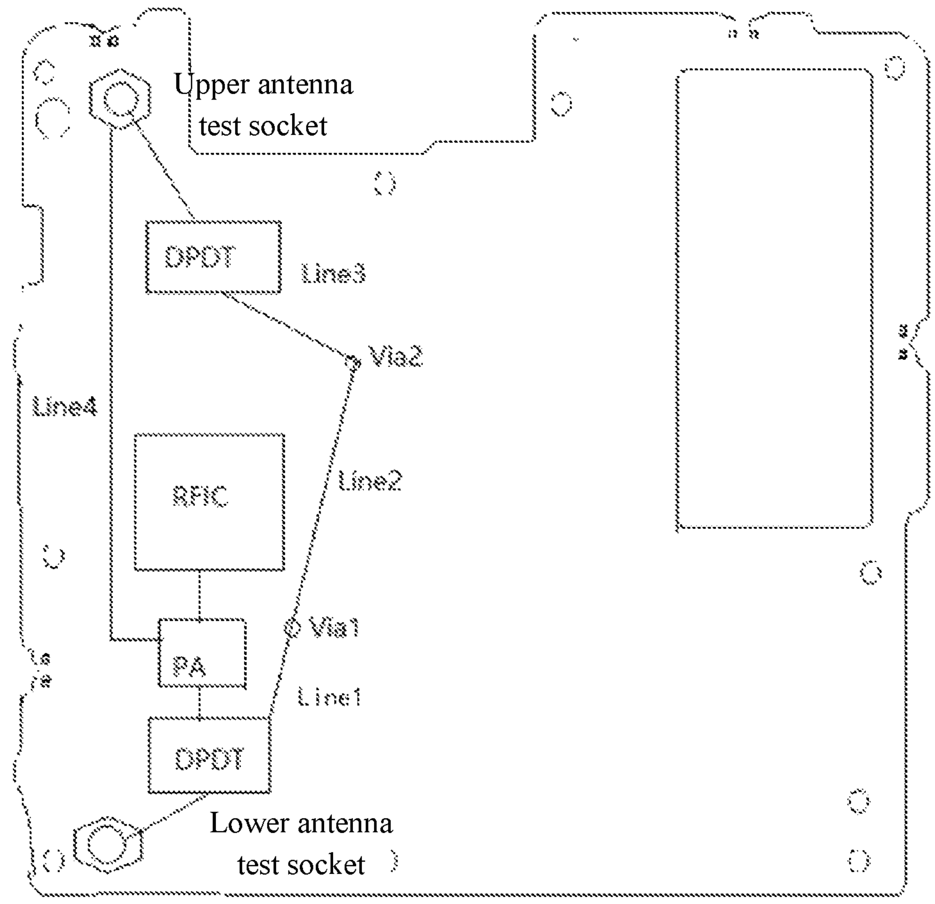
FIG. 5 is a schematic diagram of RFLESS circuit adjustment according to an embodiment of the present disclosure.

In conventional transmission paths, the signal needs to pass through multiple intermediate components. Additionally, due to the limited space for PCB routing, vias are often used to traverse different layers. Apart from the losses incurred by the components themselves, long traces and small or large vias can also introduce significant losses. In this embodiment, the adjustment of the circuit is utilized to select the transmission path based on the current network conditions and service requirements. This helps to minimize the losses caused by routing and vias. For example, as shown in FIG. 5, if the terminal device is currently in the head-hand mode and the bottom antenna performance is relatively poor when the terminal device is held in hand, the NR transmission antenna needs to switch from the bottom to the top. The transmission signal originates from the RF integrated circuit (RFIC) transceiver chip and passes through the power amplifier (PA) for amplification, the RF front-end switch, the front-stage lower antenna switch, and then travels through long traces and vias (i.e., Line1, Via1, Line2, Via2, Line3 in the diagram) before reaching the upper antenna switch. Ultimately, when the signal reaches the top test point and antenna, there is a significant overall loss, resulting in a significant decrease in conducted power. For example, if the power at the bottom is 24 dBm, the power at the top may only be 22 dBm. In this case, the efficiency advantage of the top antenna is offset by the conducted power loss. In this scenario, the routing adjustment functionality can be invoked. By using switches to bypass the path that includes switch components serving other purposes, the signal can be routed directly from the front end of the PA module through the RFLESS pathway (Line4) to the target test point. This eliminates the losses associated with long traces and vias, resulting in an increased maximum transmission power at the top. As a result, the uplink communication quality of NR is optimized.

RFLESS is a new circuit design concept proposed in this embodiment. It involves selectively bypassing or eliminating certain circuits, modules, components, and traces in the RF chain in real-time and adaptively based on considerations such as service requirements, performance, scenarios, interference, antennas, carrier aggregation (CA), or multiple-input multiple-output (MIMO) requirements, to achieve the idea of targeted circuit design reconstruction. The main objective is to achieve enhanced transmit power and improved reception sensitivity by switching the RF transmit and receive signals to the RFLESS transmission path through compatible circuitry or RF driver software design in chips, modules, and separate circuits, to minimize path losses and component insertion losses, thereby optimizing call quality and data throughput performance. The RFLESS here includes passive component RFLESS, RF front-end module RFLESS, chip internal RFLESS, front-end module external RFLESS, SAW and LTCC filter RFLESS, switch component (SPDT, DPDT, SP3T, SPNT, 3P3T, 4T4T, NPNT) RFLESS, nplexers (diplexer, triplexer, mulplexer) RFLESS, extractors, trap filters RFLESS, and RF trace path (microstrip lines/strip lines) RFLESS, among others.

In this embodiment, by adjusting the passive component, active component, circuit, or antenna and any combination thereof, the transmission path can be adjusted, such that the adjusted transmission path results in reduced resource losses compared to the original transmission path, effectively minimizing resource losses in the communication system.

In an example, in response to the adjustment of the transmission path from the RF chip to the antenna including a plurality of adjustment types, the terminal device may obtain priority of each adjustment type according to the matched transmission path adjustment mode, and then the transmission path is adjusted by using the adjustment type with the highest priority first; and in response to the performance of the transmission path after the adjustment failing to meet a preset requirement, the method proceeds to adjust the transmission path using the adjustment type of the next highest priority in descending order until the performance of the transmission path after the adjustment meets the preset requirement.

In this embodiment, by configuring the priority of the adjustment types corresponding to the adjustment mode and the transmission path adjustment mode, when adjusting the transmission path, the transmission path is adjusted by using the adjustment type with the highest priority first; and in response to the performance of the transmission path after the adjustment failing to meet a preset requirement, the method proceeds to adjust the transmission path using the adjustment type of the next highest priority in descending order until the performance of the transmission path after the adjustment meets the preset requirement. It is possible to customize different adjustment types based on specific requirements and prioritize them accordingly. In cases where the prioritized adjustment type is not suitable, the adjustment types can be switched in order of priority. This ensures that the adjustment of the transmission path is completed as quickly as possible, reducing the time and resource consumption during the adjustment process.

In an example, the terminal device may invoke a preset RF driver program according to the matched transmission path adjustment mode, where the RF driver program is configured to adjust the transmission path in a specified adjustment manner. Within the terminal device, there is a default RF driver program preset, which is configured to control the terminal device to use the default transmission paths passing through various RF front-end components. However, these paths are often not specifically tailored to different usage scenarios of the terminal device. They may result in significant losses and may not be suitable for weak signal situations for mobile phones or meet the requirements of specific service scenarios. In this embodiment, by configuring the RF driver program, it is possible to establish dedicated transmission paths. The program unit can control the corresponding signals to pass through specific path channels. For example, traffic related to CA can be routed through a CA channel, while non-CA traffic can be routed through a non-CA channel. Traffic without interference can be directed through an SAWLESS channel, while traffic with interference can be directed through an SAW channel.

For terminal device antennas, traditional RF antennas often integrate multiple frequency bands. For example, there are antennas that combine NR and LTE, NR and Wi-Fi, or NR, LTE, and GPS. These combinations are achieved through combiners that merge the signals into the antenna, but the combiners themselves introduce some losses. Additionally, in order to maintain compatibility with various standards such as NR, LTE, Wi-Fi, and GPS, or to support multiple frequency bands within a single LTE or NR standard, the efficiency of each resonant frequency point in the antenna may not be optimized for the highest performance. In this embodiment, three RFLESS antenna adjustment operation modes are provided. Mode One: For single-network RFLESS antenna mode, this mode is mainly designed for scenarios with multiple combined antennas. If the network and service module detect that the current service is in SA NR only mode and there is no need for LTE, Wi-Fi, Bluetooth, or GPS, the control module will first control the bypass of the combiner to the specified NR path. It will also control the parasitic length of the antenna and the coupling point within the NR-only range. Mode Two: For single-frequency RFLESS antenna mode, this mode is mainly designed for scenarios with a single standard but multiple frequency bands. If the network and business module detect that the current service is in China Mobile B41 mode and there is no possibility of roaming to other LTE frequency bands in the surrounding or previous cells, meaning that only B41 will be used during this time and not LTE B1, B3, B5, B8, etc., the control module will adjust the parasitic length of the antenna and the coupling point to the independent B41 frequency band. It can even tune the antenna to a specific frequency point to achieve the highest efficiency at that frequency. Mode Three: For single-point RFLESS antenna mode, this mode is mainly designed for wideband NR frequency bands such as N77/N78/N79, with frequency spans of 3300-3800 MHZ, 3300-4200 MHz, and 4400-5000 MHz, respectively. If the terminal device detects that it is currently operating at a specific frequency point or a fixed channel, such as the frequency point 3700 MHz in N78, and detects that the current working bandwidth of the frequency band is 100 M, the resonant frequency and working bandwidth of the antenna can be reduced to the specified frequency point and bandwidth range, to improve the antenna efficiency and voltage standing wave ratio for the current working channel and frequency point. That is, the operating frequency of the antenna is locked to a single point mode rather than a wideband mode. In this mode, the coverage and supported frequency points of the antenna do not need to cover the entire frequency band range. Instead, the antenna matching is tuned or changed specifically for the current frequency band and working channel frequency point.

In this embodiment, the terminal device invokes a preset RF driver program according to the matched transmission path adjustment mode. As the RF driver program is configured to adjust the transmission path in a specified adjustment manner, different RF driver programs can be customized for different transmission path adjustment modes according to different needs, such that the terminal device is enabled to self-adaptively select the transmission path. According to the scheme of this embodiment, a corresponding transmission path adjustment mode can be matched according to the currently detected service requirement and/or network feature, and a transmission path from a radio frequency chip to an antenna can be adjusted according to the matched transmission path adjustment mode. As the transmission path passes through each component, the system invariably incurs resource losses. However, the number of components through which a transmission path after the adjustment passes is less than the number of components through which the transmission path before the adjustment passes, or an RF conduction path and wiring after the adjustment are shorter than an RF conduction path and wiring before the adjustment, or an antenna coverage frequency band corresponding to an antenna path after the adjustment is less than an antenna coverage frequency band corresponding to an antenna path before the adjustment. The transmission path includes the radio frequency conduction path and the antenna path, and the antenna path is used for antenna selection. Furthermore, the performance of the transmission path after the adjustment surpasses that of the original transmission path. Hence, the adjusted transmission path results in reduced resource losses compared to the original transmission path, effectively minimizing resource losses in the communication system.

Figure 6:
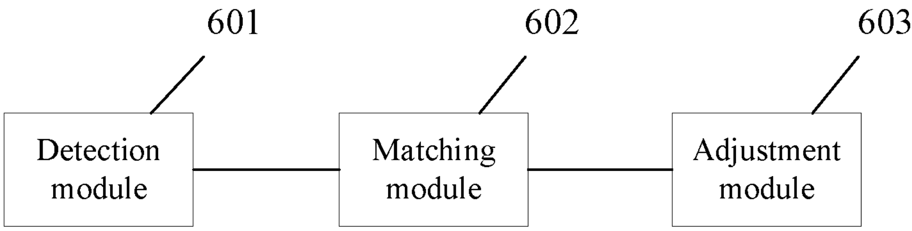
FIG. 6 is a first schematic diagram of a transmission path control apparatus according to an embodiment of the present disclosure.

An embodiment of the present disclosure relates to a transmission path control apparatus, as shown in FIG. 6, including:

- a detection module 601 configured to detect a service requirement and/or a network feature of a current terminal device;
- a matching module 602 configured to match a corresponding transmission path adjustment mode according to the currently detected service requirement and/or network feature;
- an adjustment module 603 configured to adjust a transmission path from a radio frequency (RF) chip to an antenna according to the matched transmission path adjustment mode, where the number of components through which a transmission path after the adjustment passes is less than the number of components through which the transmission path before the adjustment passes, or an RF conduction path and wiring after the adjustment are shorter than an RF conduction path and wiring before the adjustment, or an antenna coverage frequency band corresponding to an antenna path after the adjustment is less than an antenna coverage frequency band corresponding to an antenna path before the adjustment. The transmission path includes the radio frequency conduction path and the antenna path, and the antenna path is used for antenna selection. That is, the performance of the transmission path after the adjustment surpasses that of the original transmission path.

In an example, the adjustment of a transmission path from an RF chip to an antenna includes one or any combination of the following adjustment types: passive component adjustment, active component adjustment, circuit adjustment, or antenna adjustment.

In an example, the adjustment module 603 is further configured to: obtain priority of each adjustment type according to the matched transmission path adjustment mode in response to the adjustment of the transmission path from the RF chip to the antenna including a plurality of adjustment types; adjust the transmission path by using the adjustment type with the highest priority first; and in response to the performance of the transmission path after the adjustment failing to meet a preset requirement, proceed to adjust the transmission path using the adjustment type of the next highest priority in descending order until the performance of the transmission path after the adjustment meets the preset requirement.

In an example, the adjustment module 603 is further configured to invoke a preset RF driver program according to the matched transmission path adjustment mode, where the RF driver program is configured to adjust the transmission path in a specified adjustment manner.

In an example, the matching module 602 is further configured to query a preset mapping relationship to find the transmission path adjustment mode corresponding to the currently detected service requirement and/or network feature so as to obtain the matched transmission path adjustment mode, where the mapping relationship is used for storing a correspondence between service requirements and/or network features and transmission path adjustment modes.

In an example, the service requirement includes any one of a diversity mode, a multiple input multiple output (MIMO) mode, a carrier aggregation (CA) mode, a non-CA mode, a lower antenna mode, a non-lower antenna mode, a standalone (SA) network mode, a non-standalone (NSA) network mode, a harmonic intermodulation interference mode, a no harmonic intermodulation interference mode, a head-hand mode, a free space mode, a coexistence mode, or a non-coexistence mode, or any combination thereof.

In an example, the network feature includes network environment and/or path loss of a transmission path, where the network environment includes one of the following network parameter indicators or any combination thereof: operating frequency band, operating frequency point, wireless signal strength, uplink and downlink call quality, data throughput, or bit error rate.

Figure 7:
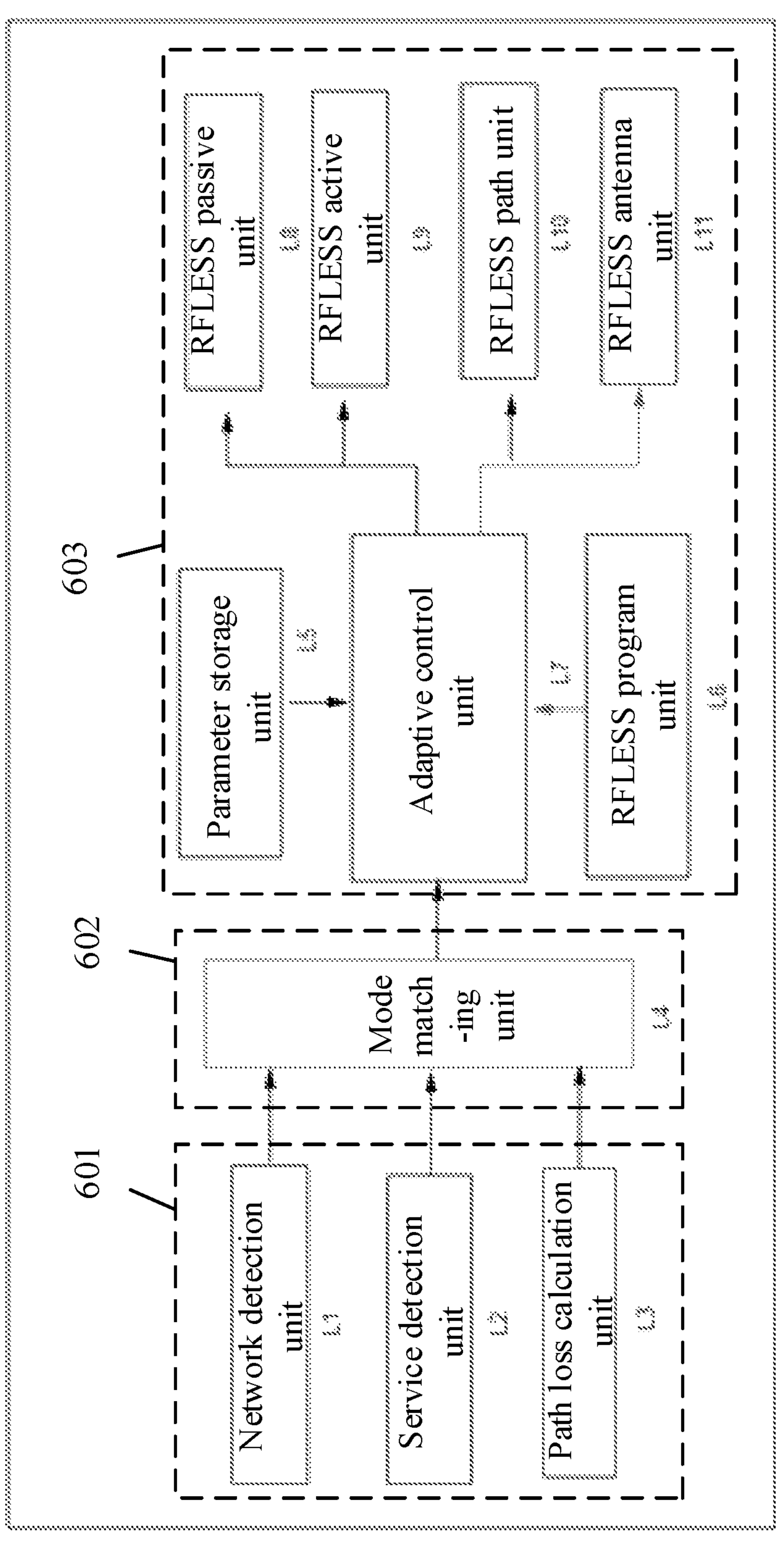
FIG. 7 is a second schematic diagram of a transmission path control apparatus according to an embodiment of the present disclosure.

In an example, as shown in FIG. 7, the detection module 601 includes an L1 Network detection unit, an L2 service detection unit, and an L3 path loss calculation unit; the matching module 602 includes an L4 RFLESS mode matching unit; and the adjustment module 603 includes an L5 parameter storage unit, an L6 RFLESS program unit, an L7 adaptive control unit, an L8 RFLESS passive unit, an L9 RFLESS active unit, an L10 RFLESS circuit unit, and an L11 RFLESS antenna unit.

Herein, the L1 network detection unit and the mode matching unit L4 are connected, and is configured to detect the network environment of the terminal device (including the working frequency band, frequency points, wireless signal strength, uplink and downlink call quality, data throughput, bit error rate, and other network parameter indicators). For example, in the case of the N78 frequency band in a 5G network, if it is determined to follow the normal path A and the current signal strength is-90 dB, with 3 data streams in a 4×4 MIMO configuration, and the highest downlink MCS is 21, while on the RFLESS path B, the corresponding signal strength is-85 dB, with 4 data streams in a 4×4 MIMO configuration, and the highest downlink MCS is 27, it is indicated that the RFLESS path B is better, and the terminal device should switch to operate on the B path.

The L2 service detection unit is connected to the mode matching unit L4 and is configured to detect service requirements of the terminal device (including a main diversity mode or a MIMO mode, CA and non-CA modes, lower antenna and non-lower antenna modes, NSA and SA modes, harmonic intermodulation interference and no-harmonic intermodulation interference modes, head-hand and free space modes, coexistence and non-coexistence modes, etc.). The L3 path loss calculation unit is connected to the mode matching unit L4 and is configured to calculate a system loss of a required communication path. The L4 mode matching unit is connected to the adaptive control unit L7 and is configured to match and select an appropriate RFLESS adjustment mode and method according to the above-mentioned detection and calculation results. The L5 parameter storage unit is connected to the adaptive control unit L7, and is configured to store RFLESS model parameters, test parameters, calibration parameters and control parameters (such as storage of loss parameter of each component, chip, module, trace, via, etc.). The L5 parameter storage unit is also configured to store the parameters for controlling the activation and deactivation of RFLESS actions in subsequent units, as well as serving as the storage for RFLESS calibration parameters.

Figure 8:
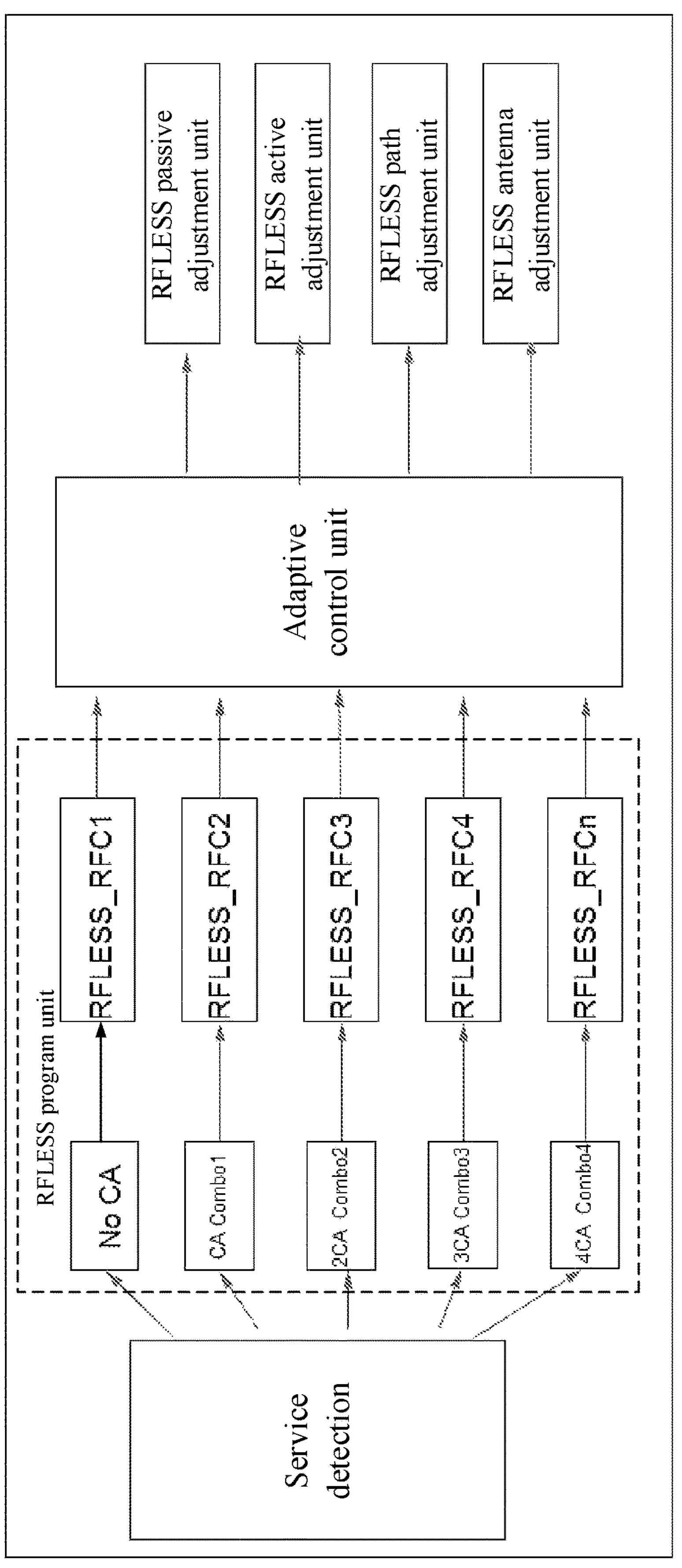
FIG. 8 is a schematic diagram of components of an RFLESS program unit according to an embodiment of the present disclosure.

The L6 RFLESS program unit is connected to the adaptive control unit L7 and is configured to invoke the RFLESS RF driver program. For example, taking the LTE B1-B3-B7-B20 CA combination as an example, as shown in FIG. 8, different components are involved in different CA combinations: non-CA combination, 2CA combination, 3CA combination, and 4CA combination. In the non-CA combination (B1), there is no need to pass through dual or multiple-throw switches, dipLexer, or tripLexer. However, in the 2CA combination (B1_B3), it requires passing through a dual-throw switch. For the 3CA combination (B1_B3_B7), it requires passing through a dual-throw switch in addition to a dipLexer. As for the 4CA combination (B1_B3_B7_B20), it requires passing through a dual-throw switch and a tripLexer. The service requirement unit can detect the current CA combination based on different service requirements and adaptively invoke the corresponding RFC (Radio Frequency Control) program to control the adjustment of RFLESS components under different CA combinations.

Figure 9:
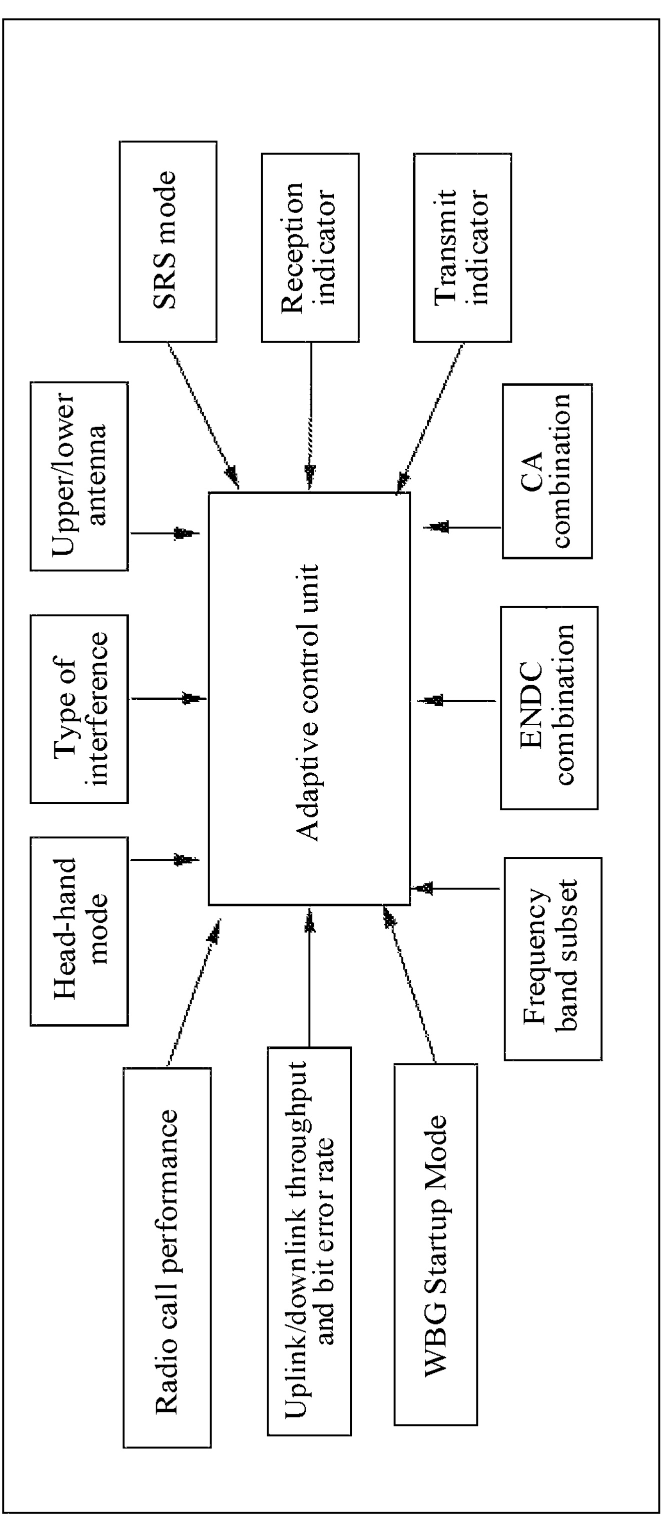
FIG. 9 is a schematic diagram of an adaptive control unit obtaining parameters according to an embodiment of the present disclosure.

The L7 adaptive control unit is connected to the various RFLESS adjustment units and is configured to provide adaptive RFLESS algorithm and hardware adjustment control based on the current network condition and service requirement (including the adjustment control of RFLESS passive unit, RFLESS active unit, RFLESS path unit, and RFLESS antenna unit). As shown in FIG. 9, based on the service requirement and network feature, the adaptive control program will perform targeted adaptive RFLESS adjustment control until the wireless call performance, uplink and downlink throughput, bit error rate, and other indicators reach the desired requirements.

In the actual working process, the adaptive control program is also responsible for selecting the specific RFLESS adjustment measures. As mentioned above, there are four adjustment measures: passive, active, path, and antenna. In practical application, the network parameters detected by the current network detection unit and the service parameters detected by the service detection unit will both be considered to compare the parameter changes before and after the change, and determines which part of the four measures plays a primary role. If the issue is related to front-end insertion loss, the passive adjustment unit is prioritized. If it is related to CA or internal bypass circuits, the active adjustment unit is prioritized. If it is related to switching between upper and lower switching, the path adjustment unit is prioritized. If it is related to antenna performance, the antenna adjustment unit is prioritized. If the relevant parameters are not clear or there are multiple factors at play, the four types of adjustments can be applied one by one, or they can be combined in pairs or even all together until the network performance requirements are met.

The L8 RFLESS passive adjustment unit is connected to the adaptive control unit L7 and is configured to provide RFLESS adjustment control for the passive unit based on the current network condition and service requirement. The L9 RFLESS active adjustment unit is connected to the adaptive control unit L7 and is configured to provide RFLESS adjustment control for the active unit based on the current network condition and service requirement. The L10 RFLESS circuit adjustment unit is connected to the adaptive control unit L7 and is configured to provide RFLESS adjustment control for the routing based on the current network condition and service requirement. The L11 RFLESS antenna adjustment unit is connected to the adaptive control unit L7 and is configured to provide RFLESS adjustment control for the antenna unit based on the current network condition and service requirement.

This embodiment, by improving the RFLESS circuit and algorithm of the terminal device, can address the current issue of low sensitivity in the RF channel transmission paths and configurations, reduce system path losses, improve the balance of all paths, enhance signal strength, and improve antenna performance, thereby enhancing communication and data service performance for users. This leads to improved call success rates, reduced call drop rates, and better performance in data services.

In an example, the terminal device can perform RFLESS control on SRS. For a terminal device supporting N41 and N78, which utilizes 4×4 MIMO, each frequency band has four RF transmission paths: TX, DRX, PRX-MIMO, and DRX-MIMO. N41 corresponds to four antennas, A1, A2, A3, and A4, while N78 corresponds to four antennas, A5, A6, A7, and A8. In circuit design, compatibility between the antenna paths of N41 and N78 is necessary and achieved through the use of antenna switches such as SP2T, 3P3T, and 4P4T. When the antenna performance of N78 is poor or affected, it is possible to switch to the corresponding path antenna of N41.

In an example, the terminal device can perform anti-interference RFLESS control. When LTE B3 is used as the ENDC anchor, the second harmonic of B3 may fall on the corresponding channel frequency of the N78 band, leading to a degradation in the reception sensitivity of N78. The higher the isolation between N78 and LTE B3, the lower the impact of harmonics and intermodulation as a result of dual connectivity. For example, LTE B3 has seven paths (L1, L2, L3, L4, L5, L6, and L7), with two TX paths (G1 and G2). N78 has four PRX paths (NP1, NP2, NP3, and NP4). The path interference unit will calculate with regard to all possible combinations of the above paths and select the combination with the lowest interference as the final ENDC working path.

In an example, the terminal device can perform balance path RFLESS control. When N78 operates in high-speed throughput with 4×4 MIMO, it is crucial for the signal strength of the four channels to be relatively balanced. Otherwise, the throughput performance may decrease due to imbalance. For example, NR N78 has seven paths, M1, M2, M3, M4, M5, M6, and M7, and the corresponding received signal strength (RSRP or RSSI) values are R1, R2, R3, R4, R5, R6, and R7. If the strengths of the original default paths are R1, R2, R3, and R4, and they are found to be imbalanced when compared against each other, it is possible to switch to a more balanced set of paths, such as R1, R3, R5, and R7, to improve the balance and throughput performance of each channel.

This embodiment provides an RFLESS 5G terminal device, which uses a service and interference detection algorithm to calculate the path loss from a chip VCO to each test socket, and can accurately measure the loss of each path, and then collect the received signal strength value, the signal equalization of each MIMO, interference, etc., so as to optimally select the best internal or external RF path. Further, by taking into account the current upper and lower antenna switching status, left and right head-hand orientations, and grip positions, the terminal device can dynamically select RFLESS transmission paths in real-time, allowing it to consistently operate on the optimal RF and antenna transmission path with low loss and high gain, thus enhancing the call quality and data throughput performance for the user.

Figure 10:
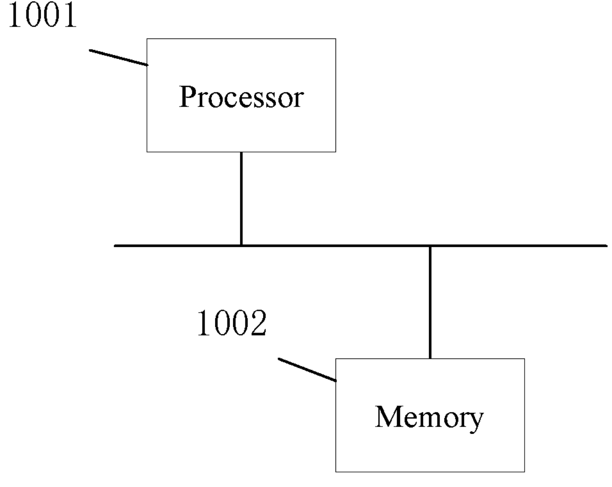
FIG. 10 is a schematic diagram of a terminal device according to an embodiment of the present disclosure.

An embodiment of the present disclosure also relates to a terminal device, as shown in FIG. 10, including: at least one processor 1001; a memory 1002 communicatively connected to the at least one processor, where the memory 1002 stores instructions executable by the at least one processor 1001, the instructions being executed by the at least one processor 1001 to enable the at least one processor 1001 to perform the transmission path control method according to any one of the above embodiments.

Herein, the memory 1002 and the at least one processor 1001 are connected by means of a bus, and the bus may include any number of bus interconnects and bridges, and the bus connects the at least one processor 1001 and various circuits of the memory 1002 together. The bus may also connect various other circuits such as a peripheral device, a voltage regulator and a power management circuit, which are well known in the art and therefore will not be further described here. A bus interface provides an interface between the bus and a transceiver. The transceiver may be one element or multiple elements, such as multiple receivers and transmitters, and provide a unit for communicating with various other apparatuses on a transmission medium. Information that has been processed by the processor 1001 is transmitted on a wireless medium by means of an antenna. In some implementations, the antenna also receives information and transmits the information to the processor 1001.

The processor 1001 is responsible for bus management and general processing, and may also provide various functions, including timing, peripheral interface, voltage regulation, power management and other control functions. The memory 1002 may be configured to store information to be used by the processor when performing operations.

An embodiment of the present disclosure relates to a computer-readable storage medium storing a computer program. The computer program, when executed by the processor, implements the methods according to the embodiments above.

Those having ordinary skill in the art can understand that all or some of the steps in the methods for implementing the above embodiments can be completed by instructing related hardware through a program, which is stored in a storage medium and includes several instructions configured to enable a device (which may be a single-chip microcomputer, a chip, etc.) or a processor to execute all or some of the steps of the methods according to the embodiments of the present disclosure. The aforementioned storage medium includes: various media that can store program codes, such as a USB flash drive, a mobile hard disk, a read-only memory (ROM), a random access memory (RAM), a magnetic disk or an optical disk.

What is claimed is:

1. A transmission path control method, comprising:

detecting a service requirement and/or a network feature of a current terminal device;

matching a corresponding transmission path adjustment mode according to the currently detected service requirement and/or network feature; and adjusting a transmission path from a radio frequency (RF) chip to an antenna according to the matched transmission path adjustment mode, wherein the number of components through which a transmission path after the adjustment passes is less than the number of components through which the transmission path before the adjustment passes, or an RF conduction path after the adjustment are shorter than an RF conduction path before the adjustment, or an antenna coverage frequency band corresponding to an antenna path after the adjustment is less than an antenna coverage frequency band corresponding to an antenna path before the adjustment, the transmission path comprising the RF conduction path and the antenna path, and the antenna path being used for antenna selection;

wherein the adjustment of a transmission path from an RF chip to an antenna comprises at least one of the following adjustment types:

passive component adjustment, active component adjustment, circuit adjustment, or antenna adjustment;

wherein the adjusting a transmission path from an RF chip to an antenna according to the matched transmission path adjustment mode comprises:

in response to the adjustment of the transmission path from the RF chip to the antenna comprising a plurality of adjustment types, obtaining priority of each adjustment type according to the matched transmission path adjustment mode;

adjusting the transmission path by using the adjustment type with the highest priority first; and in response to the performance of the transmission path after the adjustment failing to meet a preset requirement, proceeding to adjust the transmission path using the adjustment type of the next highest priority in descending order until the performance of the transmission path after the adjustment meets the preset requirement.

2. The transmission path control method of claim 1, wherein the adjusting a transmission path from an RF chip to an antenna according to the matched transmission path adjustment mode comprises:

invoking a preset RF driver program according to the matched transmission path adjustment mode, wherein the RF driver program is configured to adjust the transmission path in a specified adjustment manner.

3. The transmission path control method of claim 2, wherein the service requirement comprises at least one of:

diversity mode, multiple input multiple output (MIMO) mode, carrier aggregation (CA) mode, non-CA mode, lower antenna mode, non-lower antenna mode, standalone (SA) network mode, non-standalone (NSA) network mode, harmonic intermodulation interference mode, no harmonic intermodulation interference mode, head-hand mode, free space mode, coexistence mode, or non-coexistence mode.

4. The transmission path control method of claim 1, wherein the matching a corresponding transmission path adjustment mode according to the currently detected service requirement and/or network feature comprises:

querying a preset mapping relationship to find the transmission path adjustment mode corresponding to the currently detected service requirement and/or network feature so as to obtain the matched transmission path adjustment mode, wherein the mapping relationship is used for storing a correspondence between service requirements and/or network features, and transmission path adjustment modes.

5. The transmission path control method of claim 4, wherein the service requirement comprises at least one of:

diversity mode, multiple input multiple output (MIMO) mode, carrier aggregation (CA) mode, non-CA mode, lower antenna mode, non-lower antenna mode, standalone (SA) network mode, non-standalone (NSA) network mode, harmonic intermodulation interference mode, no harmonic intermodulation interference mode, head-hand mode, free space mode, coexistence mode, or non-coexistence mode.

6. The transmission path control method of claim 1, wherein the service requirement comprises at least one of:

diversity mode, multiple input multiple output (MIMO) mode, carrier aggregation (CA) mode, non-CA mode, lower antenna mode, non-lower antenna mode, standalone (SA) network mode, non-standalone (NSA) network mode, harmonic intermodulation interference mode, no harmonic intermodulation interference mode, head-hand mode, free space mode, coexistence mode, or non-coexistence mode.

7. The transmission path control method of claim 1, wherein the network feature comprises network environment and/or path loss of a transmission path;

wherein the network environment comprises at least one of the following network parameter indicators: operating frequency band, operating frequency point, wireless signal strength, uplink and downlink call quality, data throughput, or bit error rate.

8. A terminal device, comprising:

at least one processor; and a memory communicatively connected to the at least one processor, wherein the memory stores instructions executable by the at least one processor, the instructions being executed by the at least one processor to enable the at least one processor to perform a transmission path control method comprising:

detecting a service requirement and/or a network feature of a current terminal device;

matching a corresponding transmission path adjustment mode according to the currently detected service requirement and/or network feature; and adjusting a transmission path from a radio frequency (RF) chip to an antenna according to the matched transmission path adjustment mode, wherein the number of components through which a transmission path after the adjustment passes is less than the number of components through which the transmission path before the adjustment passes, or an RF conduction path after the adjustment are shorter than an RF conduction path before the adjustment, or an antenna coverage frequency band corresponding to an antenna path after the adjustment is less than an antenna coverage frequency band corresponding to an antenna path before the adjustment, the transmission path comprising the RF conduction path and the antenna path, and the antenna path being used for antenna selection;

wherein the adjustment of a transmission path from an RF chip to an antenna comprises at least one of the following adjustment types:

passive component adjustment, active component adjustment, circuit adjustment, or antenna adjustment;

wherein the adjusting a transmission path from an RF chip to an antenna according to the matched transmission path adjustment mode comprises:

in response to the adjustment of the transmission path from the RF chip to the antenna comprising a plurality of adjustment types, obtaining priority of each adjustment type according to the matched transmission path adjustment mode;

adjusting the transmission path by using the adjustment type with the highest priority first; and in response to the performance of the transmission path after the adjustment failing to meet a preset requirement, proceeding to adjust the transmission path using the adjustment type of the next highest priority in descending order until the performance of the transmission path after the adjustment meets the preset requirement.

9. A non-transitory computer-readable storage medium storing a computer program, wherein the computer program, when executed by a processor, implements the transmission path control method of claim 1.

10. A non-transitory computer-readable storage medium storing a computer program, wherein the computer program, when executed by a processor, implements the transmission path control method of claim 2.

11. A non-transitory computer-readable storage medium storing a computer program, wherein the computer program, when executed by a processor, implements the transmission path control method of claim 4.

12. A non-transitory computer-readable storage medium storing a computer program, wherein the computer program, when executed by a processor, implements the transmission path control method of claim 6.

13. A non-transitory computer-readable storage medium storing a computer program, wherein the computer program, when executed by a processor, implements the transmission path control method of claim 7.

* * * * *